United States Patent
Johnson

(10) Patent No.: US 11,393,033 B2
(45) Date of Patent: *Jul. 19, 2022

(54) SYSTEM AND METHOD FOR ERROR DETECTION AND RECOVERY IN AN ELECTRONIC TRADING SYSTEM

(71) Applicant: BGC PARTNERS, INC., New York, NY (US)

(72) Inventor: James C. Johnson, Cresskill, NJ (US)

(73) Assignee: BGC PARTNERS, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/085,862

(22) Filed: Oct. 30, 2020

(65) Prior Publication Data
US 2021/0049694 A1 Feb. 18, 2021

Related U.S. Application Data

(63) Continuation of application No. 11/686,647, filed on Mar. 15, 2007, now Pat. No. 10,825,089.

(51) Int. Cl.
*G06Q 40/04* (2012.01)
(52) U.S. Cl.
CPC ................... *G06Q 40/04* (2013.01)
(58) Field of Classification Search
CPC ......... G06Q 40/04; G06Q 40/06; G06Q 40/00
(Continued)

(56) References Cited

U.S. PATENT DOCUMENTS

| | | |
|---|---|---|
| 5,003,473 A | 3/1991 | Richards |
| 5,038,284 A | 8/1991 | Kramer |

(Continued)

FOREIGN PATENT DOCUMENTS

| | | |
|---|---|---|
| DK | 200 04 179 U1 | 12/2000 |
| DK | 100 40 421 A1 | 1/2001 |

(Continued)

OTHER PUBLICATIONS

E. W. y. Ho, D. K. w. Chiu and P. C. k. Hung, "Alert Based Monitoring of Stock Trading Systems," 30th Annual International Computer Software and Applications Conference (COMPSAC'06), Chicago, IL, 2006, pp. 77-86, doi: 10.1109/COMPSAC.2006.19. (Year: 2006) (Year: 2006).*

(Continued)

*Primary Examiner* — Mike Anderson
*Assistant Examiner* — John O Preston

(57) ABSTRACT

A system for error detection in a trading network comprises a memory operable to store a plurality of trader profiles, wherein a particular trader profile is associated with a particular trader. The particular trader profile comprises first contact data associated with a first client device and second contact data associated with a second client device. The memory is further operable to store at least one trading order associated with the particular trader. The system further comprises a processor communicatively coupled to the memory and operable to detect an alert associated with the first client device. In conjunction with detecting the alert, the processor is operable to determine a current status of the at least one trading order and to generate a status message regarding the determined status. The processor is further operable to transmit the status message to the second client device, wherein the transmission is based at least in part on the second contact data.

17 Claims, 4 Drawing Sheets

(58) Field of Classification Search
USPC .......................................................... 705/37
See application file for complete search history.

(56) References Cited

U.S. PATENT DOCUMENTS

| | | | |
|---|---|---|---|
| 5,305,200 | A | 4/1994 | Hartheimer et al. |
| 5,309,506 | A | 5/1994 | Alexander |
| 5,517,406 | A | 5/1996 | Harris et al. |
| 5,530,696 | A * | 6/1996 | Boggs .................. H04L 12/433 370/252 |
| 5,727,165 | A * | 3/1998 | Ordish .................. G06Q 40/04 705/37 |
| 5,918,218 | A | 6/1999 | Harris et al. |
| 5,987,419 | A | 11/1999 | Hachino et al. |
| 6,029,146 | A * | 2/2000 | Hawkins ................ G06Q 40/00 235/379 |
| 6,049,783 | A | 4/2000 | Segal et al. |
| 6,226,365 | B1 | 5/2001 | Mashinsky |
| 6,236,972 | B1 | 5/2001 | Shkedy |
| 6,336,124 | B1 * | 1/2002 | Alam .................... G06F 40/258 715/205 |
| 6,442,258 | B1 | 8/2002 | Mashinsky |
| 6,445,907 | B1 | 9/2002 | Middeke et al. |
| 6,477,647 | B1 | 11/2002 | Venkatraman et al. |
| 6,519,463 | B2 | 2/2003 | Tendler |
| 6,560,456 | B1 | 5/2003 | Lohtia et al. |
| 6,606,716 | B1 | 8/2003 | Vrhel, Jr. et al. |
| 6,686,074 | B2 | 2/2004 | Muth et al. |
| 7,124,101 | B1 | 10/2006 | Mikurak |
| 7,127,421 | B1 | 10/2006 | Beacham et al. |
| 7,127,422 | B1 | 10/2006 | Bundy |
| 2001/0034627 | A1 | 10/2001 | Curtis et al. |
| 2001/0039527 | A1 | 11/2001 | Ordish et al. |
| 2002/0059141 | A1 | 5/2002 | Davies et al. |
| 2002/0128954 | A1 * | 9/2002 | Evans .................... G06Q 40/04 705/37 |
| 2003/0061068 | A1 | 3/2003 | Curtis |
| 2003/0083973 | A1 | 5/2003 | Horsfall |
| 2003/0093362 | A1 | 5/2003 | Tupper et al. |
| 2003/0101128 | A1 | 5/2003 | Abernethy |
| 2003/0200171 | A1 | 10/2003 | Kochansky |
| 2004/0193527 | A1 | 9/2004 | Kelly et al. |
| 2004/0236668 | A1 | 11/2004 | Toffey |
| 2005/0049955 | A1 | 3/2005 | Kohnhorst et al. |
| 2005/0137961 | A1 | 6/2005 | Brann et al. |
| 2005/0216394 | A1 | 9/2005 | Monteleone et al. |
| 2005/0222933 | A1 | 10/2005 | Wesby |
| 2005/0228748 | A1 | 10/2005 | Togher et al. |
| 2006/0080212 | A1 | 4/2006 | Anderson et al. |
| 2006/0178918 | A1 | 8/2006 | Mikurak |
| 2006/0265296 | A1 | 11/2006 | Glinberg et al. |

FOREIGN PATENT DOCUMENTS

| | | |
|---|---|---|
| JP | 10-320458 | 12/1998 |
| JP | 2002-115893 | 4/2002 |
| JP | 2005-62942 | 3/2005 |
| JP | 2002-24720 | 1/2022 |
| JP | 2002-83138 | 3/2022 |
| WO | WO 99/27477 | 6/1999 |
| WO | WO 00/52650 | 9/2000 |
| WO | WO 00/65510 | 11/2000 |
| WO | WO 02/052380 A2 | 4/2002 |
| WO | WO 03/028347 A2 | 4/2003 |
| WO | WO 03/061195 A1 | 7/2003 |
| WO | WO 2005/017475 A2 | 2/2005 |
| WO | WO 2005/086933 A2 | 9/2005 |

OTHER PUBLICATIONS

E. L. Madruga and L. M. R. Tarouco, "Fault management tools for a cooperative and decentralized network operations environment," in IEEE Journal on Selected Areas in Communications, vol. 12, No. 6, pp. 1121-1130, Aug. 1994, doi: 10.1109/49.310968. (Year: 1994) (Year: 1994).*

E. P. Duarte and A. L. dos Santos, "Network fault management based on SNMP agent groups," Proceedings 21st International Conference on Distributed Computing Systems Workshops, Mesa, AZ, USA, 2001, pp. 51-56, doi: 10.1109/CDCS.2001.918686. (Year: 2001) (Year: 2001).*

Tschammer, V. et al., "The Performance of Multiple Traders operating in the Same Domain", 0-8186-2755-7/92, IEEE, pp. 122-128, 1992.

Lirov, Yuval, "Fuzzy Logic for Distributed Sustems Troubleshooting", 0-7803-0614-7/93, IEEE, pp. 986-991, 1993.

Popien, Claudia, et al., "A Service Request Description Language", Aachen University of Technology, Department of Computer Science IV, Aachen, Germany, pp. 37-52, 1994.

ThiBen, Dirk, et al., "Finding Optimal Services Within a CORBA Trader", Lecture Notes in Computer Science, vol. 1161, pp. 200-213, 1996.

"Web Site Will Have Panic Button for Applicants", American Banker, vol. 163, No. 181, NDN:173-0199-6336-7, 2 pages, 1998.

Linnhoff-Popien, Claudia, et al., "Assessing Service Properties With Regards to a Requested QOS: The Service Metric", IFFP Conference Proceedings, vol. 139, pp. 273-280, 1999.

"On line traders shake markets", Business Asia, vol. 8, No. 6, NDN:218-0180-3641-6, 2 pages, 2000.

"London Exchange Blames Trader for May 14 Drop", the Wall Street Journal, pace C13, 2001.

Forsyth, Randall W., Editor, "Order, Please", The Electronic Investor, Barron's, cover and p. 41, 2001.

Zwick, Steve, et al., "Error highlight electronic risks", Futures, vol. 31, No. 1, NDN: 218-0451-0489-8, 2 pages, 2002.

"Commerzbank Selects NetScout's nGenius Performance Management System", NDN: 121-0555-5129-9, 2 pages, 2002.

"Precisa To Embed Sarantel GPS Antenna in New GSM/GPS Combination Mobile Phone", Business Wire, NDN: 219-0809-5158-1, 2 pages, 2004.

"Germany's Commerzebank Standartizes on Micromuse's Netcool Solutions for Realtime Management of Financial Services", NDN: 121-0539-4553-5, 2 pages, 2004.

"Network General Solutions Help Financial Institutions Reduse the Risk of Loss, Modification or Misuse of Financial Information During Online Transactions", Business Wire, NDN: 218=1044-3676-9, 2 pages, 2004.

"Teletouch Signs Duncanville Independent School District for Vtrax™ GPS-Based Fleet Tracking; Solution Features Panic Button Alert Service for Bus Drivers", Business Wire, NDN: 219-0993-3212-0, 2 pages, 2005.

NetScout's nGenius Solution Supports Real-Time Performance of Time-Sensitive Trading Applications for Shanghai Futures Exchange, NDN: 121-0567-0240-4, 2 pages, 2005.

McKenzie, H.; All Talk No Action; Banking Technology; vol. 14, No. 4; pp. 32-34.

Soros, et al.; In Search of Better Ways to Control Risk; Chartered Banker; vol. 4, No. 3; 1 page.

McGuire, C.; Thomson ESG Comes Around; Wall Street & Technology; vol. 17, No. 2; 2 pages.

Rafalaf, A.; SEC to Allow Third Parties to Confirm/Affirm Trades; Wall Street & Technology; vol. 17, No. 7; 1 page.

PCT Notification of Transmittal of the International Search Report and the Written Opinion of the International Searching Authority for International Application No. PCT/US08/56950; 8 pages.

PCT Notification of Transmittal of the International Search Report and the Written Opinion of the International Searching Authority for International Application No. PCT/US08/62745; 8 pages.

E.W. y. Ho, D. K. w. Chiu and P. C. k. Hung, "Alert Based Monitoring of Stock Trading Systems," 30th Annual International Computer Software and Applications Conference (COMPSAC'06), Chicago, IL, 2006, pp. 77-86, doi: 10.1109/COMPSAC.2006.19. (Year: 2006).

(56) References Cited

OTHER PUBLICATIONS

E. L. Madruga and L. M. R. Tarouco, "Fault management tools for a cooperative and decentralized network operations environment," in IEEE Journal on Selected Areas in Communications, vol. 12, No. 6, pp. 1121-1130, Aug. 1994, doi: 10.1109/49.310968. (Year: 1994).
E. P. Duarte and A. L. dos Santos, "Network fault management based on SNMP agent groups," Proceedings 21st International Conference on Distributed Computing Systems Workshops, Mesa, AZ., USA, 2001, pp. 51-56, doi: 10.1109/CDCS.2001.918686. (Year: 2001).

\* cited by examiner

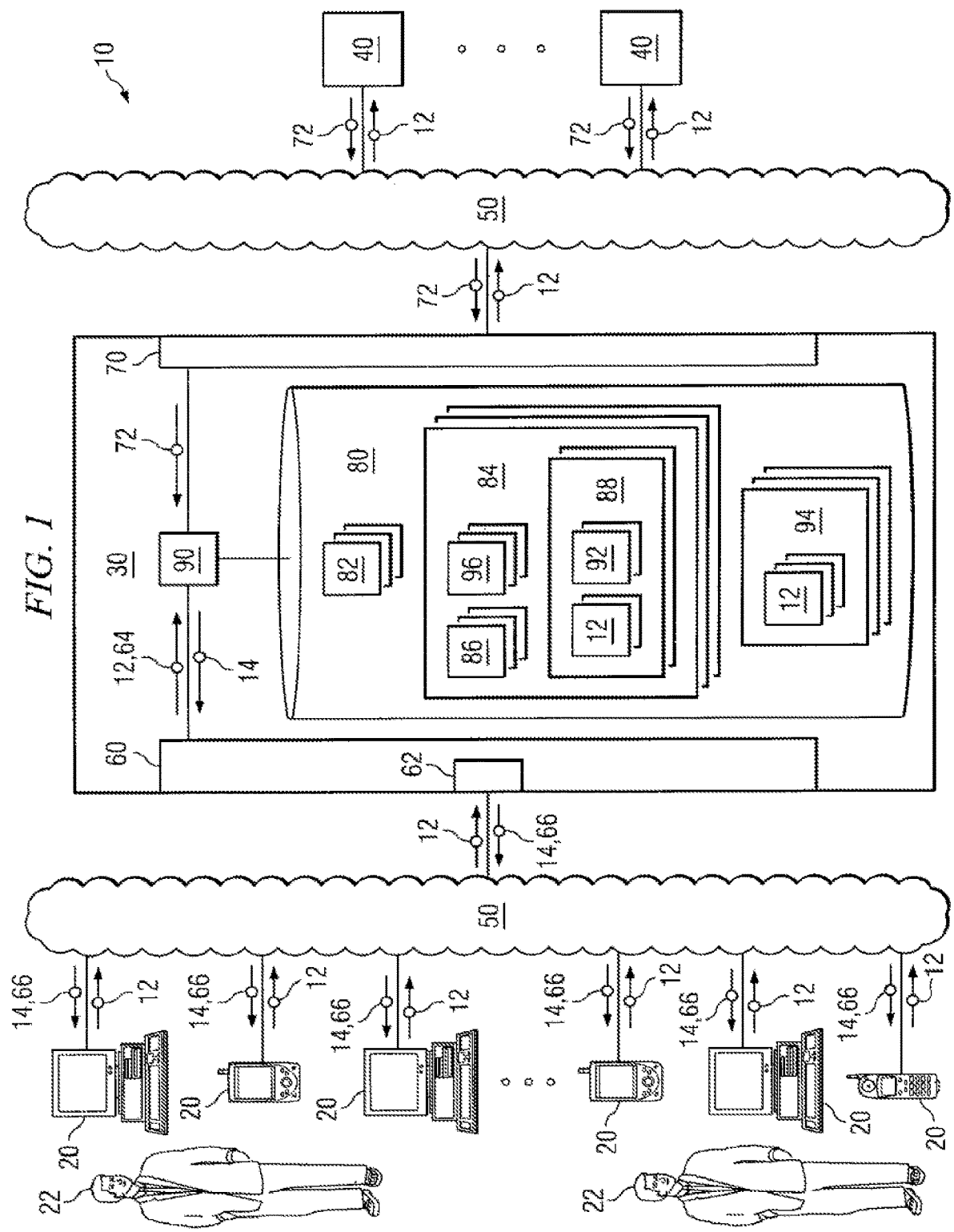

ORDER LOG

| TRADING ORDER | TRADING PRODUCT | QUANTITY | PRICE | TIME RECEIVED | CLIENT | STATUS | TIME UPDATED |
|---|---|---|---|---|---|---|---|
| BID A | X | 1,000,000 | $72.50 | 06/07/2006 15:45:32 | WORKSTATION A | EXECUTED | 06/07/2006 15:46:05 |
| OFFER B | Y | 5,000,000 | $17.50 | 06/07/2006 15:47:14 | WORKSTATION A | CANCELED | 06/07/2006 15:48:10 |
| OFFER C | Z | 3,000,000 | $12.50 | 06/07/2006 15:47:23 | WORKSTATION A | EXECUTED | 06/07/2006 15:48:30 |
| BID D | Z | 10,000,000 | $11.50 | 06/07/2006 15:48:02 | WORKSTATION A | EXECUTED | 06/07/2006 15:49:05 |
| BID E | X | 1,500,000 | $72.50 | 06/07/2006 15:48:06 | WORKSTATION A | PENDING | 06/07/2006 15:49:23 |

CONTACT DATA

| CLIENT | CONTACT DATA | CLASSIFICATION |
|---|---|---|
| WORKSTATION A | 1.160.10.240 | PRIMARY |
| WORKSTATION B | 2.234.20.120 | SECONDARY |
| PDA | 571.242.1275 | TERTIARY |
| MOBILE PHONE | 571.823.8573 | TERTIARY |
| E-MAIL ACCOUNT A | john@trader.net | SECONDARY |
| E-MAIL ACCOUNT B | ben@money.net | TERTIARY |

TRADER PREFERENCES

| | |
|---|---|
| GENERATE AND TRANSMIT STATUS MESSAGE IF CLIENT IS DISCONNECTED FOR MORE THAN FIVE MINUTES | |
| GENERATE AND TRANSMIT STATUS MESSAGE IF NETWORK SPEED IS LESS THAN 46 kbps | |

*FIG. 2*

64 — ALERT: CONNECTION FAILURE

STATUS MESSAGE

TIME OF ALERT: 15:48:08
TIME OF STATUS MESSAGE: 15:53:08

| TRADING ORDER | TRADING PRODUCT | QUANTITY | PRICE | TIME RECEIVED | STATUS | TIME UPDATED |
|---|---|---|---|---|---|---|
| OFFER B | Y | 5,000,000 | $17.50 | 06/07/2006 15:47:14 | CANCELED | 06/07/2006 15:48:10 |
| OFFER C | Z | 3,000,000 | $12.50 | 06/07/2006 15:47:23 | EXECUTED | 06/07/2006 15:48:30 |
| BID D | Z | 10,000,000 | $11.50 | 06/07/2006 15:48:10 | EXECUTED | 06/07/2006 15:49:05 |
| BID E | X | 1,500,000 | $72.50 | 06/07/2006 15:49:23 | PENDING | 06/07/2006 15:49:23 |

NET CHANGE IN POSITION SINCE TIME OF ALERT

| TRADING PRODUCT Z | 7,000,000 LONG |
|---|---|

*FIG. 3*

SYSTEM AND METHOD FOR ERROR DETECTION AND RECOVERY IN AN ELECTRONIC TRADING SYSTEM

CROSS REFERENCE TO RELATED APPLICATIONS

This application is a continuation of U.S. patent application Ser. No. 11/686,647 filed on Mar. 15, 2007, the content of which are incorporated herein by reference in their entirety.

TECHNICAL FIELD OF THE INVENTION

The present invention relates generally to electronic error detection and recovery and more specifically to a system and method for error detection and recovery in an electronic trading system.

BACKGROUND OF THE INVENTION

In recent years electronic trading systems have gained widespread acceptance for the trading of a variety of items such as goods, services, financial instruments, and commodities. For example, electronic trading systems may facilitate the trading of financial instruments and commodities such as stocks, bonds, currency, futures, commodities, oil, and gold.

Generally, an electronic trading system receives and processes trading orders from traders. For example, an electronic trading system may process trading orders by matching buy orders for a particular item with sell orders for the same item. Upon executing a trade, an electronic trading system may send a confirmation message to the trader that submitted the executed trading order. Occasionally, the electronic trading system may experience a failure that prevents the system from sending a confirmation message to the trader.

SUMMARY OF THE INVENTION

In accordance with the present invention, the disadvantages and problems associated with prior electronic trading systems have been substantially reduced or eliminated.

A system for error detection in a trading network comprises a memory operable to store a plurality of trader profiles, wherein a particular trader profile is associated with a particular trader. The particular trader profile comprises first contact data associated with a first client device and second contact data associated with a second client device. The memory is further operable to store at least one trading order associated with the particular trader. The system further comprises a processor communicatively coupled to the memory and operable to detect an alert associated with the first client device. In conjunction with detecting the alert, the processor is operable to determine a current status of the at least one trading order and to generate a status message regarding the determined status. The processor is further operable to transmit the status message to the second client device, wherein the transmission is based at least in part on the second contact data.

The invention has several important technical advantages. Various embodiments of the invention may have none, some, or all of these advantages. One advantage is that the trading system is operable to detect when a first client device associated with a particular trader experiences an alert condition. In conjunction with detecting the alert condition, the trading system may determine the status of trading orders associated with the particular trader. In some embodiments, trading system is operable to calculate metrics such as the change in market position of the particular trader since the detection of the alert condition. The trading system may then generate and transmit a status message to a second client device associated with the particular trader. Thus, the trading system may maintain the flow of status information to a trader even when a particular client device associated with the trader experiences an alert condition. By maintaining the flow of status information to traders, trading system may promote confidence in the reliability of the trading system. Because traders with confidence in the trading system are more likely to submit more and/or larger trading orders, the trading system may increase liquidity in the market.

Other advantages of the present invention will be readily apparent to one skilled in the art from the description and the appended claims.

BRIEF DESCRIPTION OF THE DRAWINGS

For a more complete understanding of the present invention and its advantages reference is now made to the following description taken in conjunction with the accompanying drawings, in which:

FIG. 1 illustrates one embodiment of a trading system, according to certain embodiments;

FIG. 2 illustrates an example trader profile, according to certain embodiments;

FIG. 3 illustrates an example status message, according to certain embodiments.

DETAILED DESCRIPTION OF THE INVENTION

Figure 4:
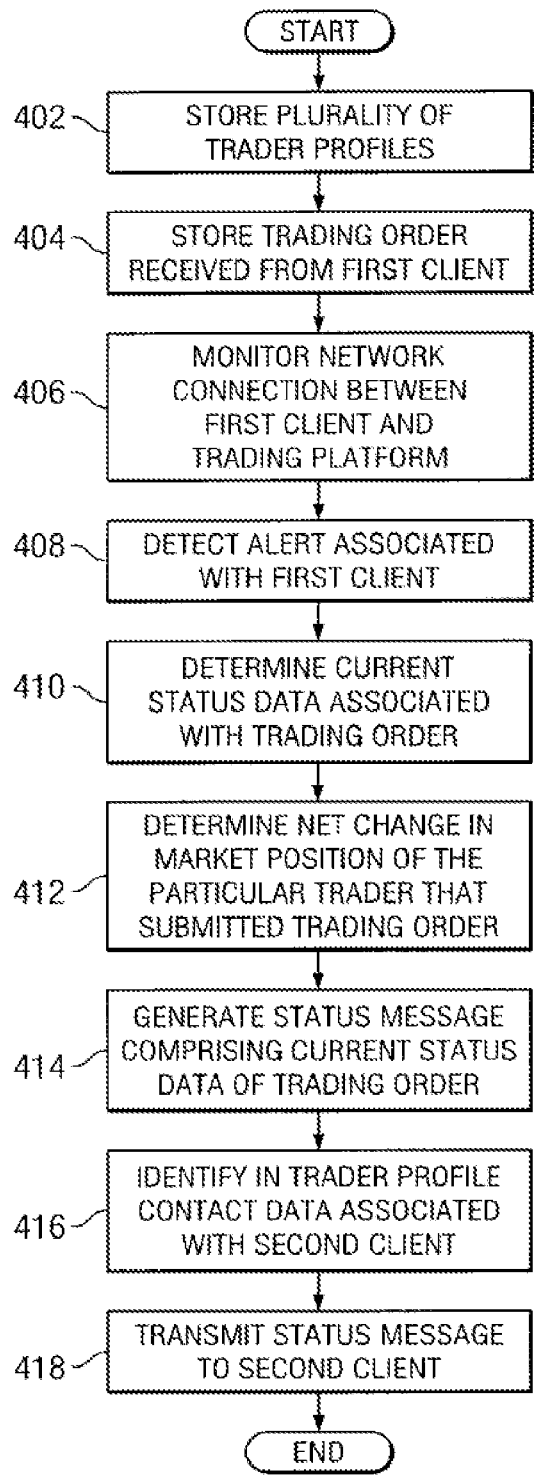
FIG. 4 illustrates a flowchart for generating and transmitting a status message, according to certain embodiments.

FIG. 1 illustrates one embodiment of a trading system 10. Trading system 10 may comprise a plurality of clients 20, a trading platform 30, and one or more market centers 40 communicatively coupled by a network 50. Generally, trading system 10 is operable to receive, route, and match trading orders 12 submitted by traders 22. Trading system 10 is further operable to detect when a first client 20 associated with trader 22 experiences a failure or network disconnection. In conjunction with detecting a failure or network disconnection of the first client 20, trading system 10 may determine the status of trading orders 12 submitted by trader 22. Trading system 10 may then generate and transmit a status message 14 to a second client 20 associated with trader 22. Thus, trading system 10 may maintain real-time flow of status information to trader 22 even when a particular client 20 associated with trader 22 experiences a failure or network disconnection.

Trading system 10 comprises a plurality of clients 20. Clients 20 represent any suitable local or remote end-user devices that may be used by traders 22 to access one or more elements of trading system 10, such as trading platform 30. A particular client 20 may comprise a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of system 10. Client 20 may also comprise any suitable user interface such as a display, microphone, keyboard, or any other appropriate terminal equipment according to particular configurations and arrangements. A particular trader 22 may be associated with any number and combination of clients 20. It will be understood that there may be any number of clients 20 communicatively coupled to trading platform 30 via network 50.

Clients 20 are operable to receive trading orders 12 from traders 22 and to send trading orders 12 to trading platform 30. Trading orders 12 may comprise orders to trade products such as, for example, currencies, financial instruments, stocks, bonds, futures contracts, equity securities, mutual funds, options, derivatives, commodities, or any number and combination of suitable trading products. In particular embodiments, trading order 12 may specify a target price for the trading product. Trading orders 12 may comprise bids, offers, market orders, limit orders, stop loss orders, day orders, open orders, GTC ("good till cancelled") orders, "good through" orders, "all or none" orders, "any part" orders, or any other suitable order for trading.

A particular trading order 12 may be referred to as an order or a counterorder. Orders and counterorders represent complementary actions such as, for example, buying and selling. If the party that submits a particular order is referred to as trader 22, the party that submits a corresponding counterorder may be referred to as a "counterparty" trader 22. If a particular order represents a buy order (e.g., bid, take, 10 lift, etc.), then a corresponding counterorder may represent a sell order (e.g., offer, hit, etc.). Conversely, if a particular order represents a sell order, then a corresponding counterorder may represent a buy order.

Although clients 20 are described herein as being used by "traders" 22, it should be understood that the term "trader" is meant to broadly apply to any user of trading system 10, whether that user is an agent acting on behalf of a principal, a principal, an individual, a legal entity (such as a corporation), or any machine or mechanism that is capable of placing and/or responding to trading orders 12 in system 10. Certain traders 22 may be customers and other traders 22 may be market makers.

A market maker is any individual, firm, or other entity that submits and/or maintains either or both bid and offer trading orders 12 simultaneously for the same instrument. For example, a market maker may be a brokerage or bank that maintains either a firm bid and/or offer price in a given security by standing ready, willing, and able to buy and/or sell that security at publicly quoted prices. A market maker generally displays bid and/or offer prices for specific numbers of specific securities, and if these prices are met, the market maker will immediately buy for and/or sell from its own accounts. According to certain embodiments, a single trading order 12 may be filled by a number of market makers at potentially different prices.

A customer may be any user of trading system 10 that is not a market maker. A customer may be an individual investor, an agent acting on behalf of a principal, a principal, an individual, a legal entity (such as a corporation), or any machine or mechanism that is capable of placing and/or responding to trading orders 12 in system 10.

As explained above, clients 20 may be communicatively coupled to trading platform 30 via network 50. Network 50 is a communication platform operable to exchange data or information between clients 20 and trading platform 30 and/or market centers 40. According to certain embodiments, a particular network 50 may comprise a plain old telephone system (POTS), a packet data network (PDN), a local area network (LAN), metropolitan area network (MAN), wide area network (WAN), wireless local area network (WLAN), virtual private network (VPN), intranet, Internet, or any other appropriate architecture or system that facilitates communications between clients 20 and trading platform 30 and/or market centers 40. It should be understood that network 50 may comprise any combination of the above examples or any suitable communications network.

Market centers 40 comprise all manner of order execution venues including exchanges, Electronic Communication Networks (ECNs), Alternative Trading Systems (ATSs), market makers, or any other suitable market participants. Each market center 40 maintains a bid and offer price in a given trading product by standing ready, willing, and able to buy or sell at publicly quoted prices, also referred to as market center prices. A particular market center 40 may facilitate trading of multiple trading products, such as, for example, stocks, fixed income securities, futures contracts, currencies, precious metals, and so forth. Market centers 40 may be communicatively coupled to trading platform 30 via network 50.

Trading platform 30 is a trading architecture that facilitates the routing, matching, and otherwise processing of trading orders 12. Trading platform 30 may comprise a management center or a headquartering office for any person, business, or entity that seeks to route, match, process, or fill trading orders 12. Accordingly, trading platform 30 may include any suitable combination of hardware, software, personnel, devices, components, elements, or objects that may be utilized or implemented to achieve the operations and functions of an administrative body or a supervising entity that manages or administers a trading environment. Trading platform 30 may comprise a client interface 60, a market interface 70, a memory 80, and a processor 90.

Client interface 60 in trading platform 30 is communicatively connected to network 50 and supports communications between clients 20 and the various components of trading platform 30. According to certain embodiments, client interface 60 represents a transaction server that receives trading orders 12 communicated by clients 20 via network 50. In some embodiments, client interface 60 may comprise one or more sensors 62.

Sensor 62 is generally operable to monitor communications between trading platform 30 and other components of trading system 10. In some embodiments, sensor 62 may represent a network tap, packet sniffer, or any suitable hardware and/or software operable to intercept and log traffic passing between clients 20, trading platform 30, and/or other components of trading system 10. Sensor 62 may be operable to monitor network connections between clients 20 and trading platform 30. In some embodiments, sensor 62 may transmit test signals 66 to a particular client 20 to verify that the particular client 20 is connected to network 50.

Sensor 62 may be configured to generate alert 64 in response to any suitable type and/or combination of detected events. In particular, if client 20 fails to respond to test signal 66, sensor 62 may determine that client 20 and/or a network connection associated with client 20 has failed. Accordingly, sensor 62 may generate alert 64 indicating a network disconnection associated with client 20. As another example, sensor 62 may generate alert 64 upon detecting that a network connection between trading platform 30 and client 20 has been terminated prior to client 20 signing off from a network portal associated with trading platform 30. In some embodiments, sensor 62 may generate an alert 64 in response to detecting a data packet, sent from client 20, that represents a network intrusion attempt or comprises potentially harmful code such as, for example, a virus, spyware, a trojan horse, a worm, or any other harmful communication. It should be understood that sensor 62 is operable to generate alert 64 in response to detecting any suitable type of event or failure associated with trading system 10.

In generating alert 64, sensor 62 may configure alert 64 to comprise any suitable information regarding the detected event. In particular, alert 64 may comprise information regarding the type of the detected event, the time of the detected event, the identity of client 20 associated with the detected event, the identity of trader 22 associated with client 20, the source IP address and/or destination IP address of a data packet associated with the detected event, and/or any other suitable characteristic associated with the detected event. Sensor 62 is operable to transmit alert 64 to processor 90 in trading platform 30.

Market interface 70 is communicatively connected to market centers 40 and supports communications between market centers 40 and the various components of trading platform 30. Market interface 70 may comprise a transaction server that receives trading orders 12 communicated by market centers 40. In addition, market interface 70 may send to market centers 40 trading orders 12 received from clients 20 connected directly to trading platform 30. Market interface 70 may also receive market data 72 from market centers 40. Market data 72 may comprise information regarding market conditions such as, for example, trading volumes, best bid/offer prices, trends in prices, trends in trading volumes, time of entry of trading orders 12, number of outstanding trading orders 12, number of active traders 22, and/or any other suitable information regarding conditions in trading system 10.

As explained above, trading platform 30 may comprise memory 80 and processor 90. Memory 80 is generally operable to store logic 82 and one or more trader profiles 84. Logic 82 generally comprises rules, algorithms, formulas, functions, tables, or any suitable instructions for performing the functions and operations described herein.

Trader profiles 84 generally comprise information regarding the identity, trading preferences, trading history, and accounts of traders 22. Trading platform 30 may allow a person or entity to register to use trading system 10 as trader 22. When a particular trader 22 registers to use trading system 10, trading platform 30 may generate trader profile 84 for that trader 22. Thus, for each trader 22 in trading system 10, memory 80 may store a corresponding trader profile 84. Trader profile 84 of a particular trader 22 may comprise relevant information such as, for example, the name, address, employer, and account information of that trader 22. Trader profile 84 of a particular trader 22 may further comprise contact data 86 for clients 20 associated with the particular trader 22.

Contact data 86 for client 20 generally comprises a network address, an email address, a phone number, a port identifier, an IP address, and/or any other suitable information for communicating with client 20. Trading platform 30 may generally use contact data 86 in trader profile 84 to notify trader 22 regarding the status of trading orders 12 submitted by trader 22. In some embodiments, a particular trader 22 may use multiple clients 20 to communicate with trading platform 30. For example, on some occasions, a particular trader 22 may submit trading orders 12 to trading platform 30 using a personal digital assistant (PDA). On other occasions, the particular trader 22 may use a cellular phone or personal computer to submit trading orders 12 to trading platform 30. Although a PDA, cellular phone, and personal computer are mentioned above as examples of clients 20, it should be understood that client 20 may comprise any suitable device (wireless, wireline, or otherwise), component, or element capable of receiving, processing, storing, and/or communicating information with other components of system 10.

In some embodiments, trader profile 84 associated with trader 22 may comprise one or more order logs 88. Order log 88 associated with a particular trader 22 generally comprises data regarding the status of trading orders 12 submitted by trader 22. For a particular trading order 12, order log 88 may comprise information regarding the size, price, and/or trading product associated with trading order 12. Order log 88 may further comprise status data 92 such as, for example, whether trading order 12 has been executed, the portion of trading order 12 that has been filled, whether trading order 12 has been cancelled, whether trading order 12 is pending, and/or any other suitable information regarding the status of trading order 12. Order log 88 may indicate the time at which a particular trading order 12 was received, the time at which the particular trading order 12 was executed or cancelled, and/or the time at which status data 92 in order log 88 was last updated.

In some embodiments, status data 92 indicates the position of a particular trading order 12 in an order stack 94. Processor 90 may detect a change in status of the particular trading order 12 based at least in part on activity in order stack 94. Order stack 94 generally represents a queue, list, and/or sequence of trading orders 12. Trading platform 30 may store different trading orders 12 in respective order stacks 94 according to the price and trading product associated with the different trading orders 12. For example, a bid for Trading Product X at $11.00 per unit may be stored in memory 80 in an $11.00 order stack 94 associated with Trading Product X, and a bid for Trading Product Y at $9.00 per unit may be stored in a $9.00 order stack 94 associated with Trading Product Y. Within a given order stack 94, a recently received trading order 12 may be listed above or below an earlier received trading order 12, such that the earlier received trading order 12 is executed first. Thus, trading platform 30 may use order stacks 94 to manage the execution of trading orders 12.

As explained above, status data 92 may indicate the position of a particular trading order 12 in order stack 94. For example, if client 20 submits Bid A for 1,000,000 units of trading product X at $12.00 per unit, trading platform 30 may assign Bid A to the $12.00 order stack 94 for trading product X. In this example, due to the particular time when Bid A was received, Bid A may be the fifth order in the $12.00 order stack 94. In this example, due to cancellation and/or execution of other trading orders 12, Bid A moves up from the fifth position to the second position in the $12.00 order stack 94. Processor 90 may detect this movement of Bid A in the $12.00 order stack 94 and may update status data 92 in order log 88 to indicate the new position of Bid A in the $12.00 order stack 94. In some embodiments, based at least in part on the updated status data 92, processor 90 may, upon receiving alert 64, notify 15 trader 22 regarding the position of Bid A in order stack 94. It should be understood that order log 88 in trader profile 84 associated with trader 22 may comprise any suitable information regarding the nature and status of one or more trading orders 12 submitted by trader 22.

As explained above, memory 80 is communicatively coupled to processor 90. Processor 90 is generally operable to receive trading orders 12 from clients 20, to record trading orders 12 in memory 80, to match orders and counterorders, and/or to route trading orders 12 to market centers 40. Processor 90 is further operable to receive alerts 64 from sensors 62. Upon receiving alert 64 associated with a first client 20 of a particular trader 22, processor 90 is operable to determine current status data 92 of trading orders 12 submitted by the particular trader 22. Processor 90 is further operable to generate status messages 14 comprising current status data 92 of trading orders 12. According to certain embodiments, processor 90 may then identify in trader profile 84 contact data 86 for a second client 20 of trader 22. Processor 90 may then transmit the generated status message 14 to the second client 20 of trader 22. Thus, trading system 10 may provide current status data 92 to trader 22 even when a particular client 20 of trader 22 is disconnected from network 50 and/or experiences a failure. Processor 90 may comprise any suitable combination of hardware and/or software implemented in one or more modules to provide the described function or operation.

As explained above, processor 90 is operable to generate status message 14. Status message 14 may comprise any suitable information regarding trading orders 12 submitted by trader 22. Status message 14 may indicate whether a particular trading order 12 has been executed or canceled. Status message 14 may comprise information regarding the position of the affected trader 22 in the market. In particular, status message 14 may report the net change in market position of the affected trader 22 since the time of alert 64, since the beginning of the trading day, or since any suitable time. According to certain embodiments, status message 14 may indicate the position of a particular trading order 12 in order stack 94. In some embodiments, status message 14 may comprise market data 72 regarding trading activity in trading system 10 since the time of alert 64 or since any suitable time.

It should be understood that the internal structure of trading platform 30 and the interfaces, processors, and memory devices associated therewith are malleable and can be readily changed, modified, rearranged, or reconfigured to achieve the intended operations of trading platform 30. In particular, it should be understood that the functions and operations of client interface 60, sensor 62, and/or market interface 70 may be performed by processor 90 in trading platform 30.

In operation, trader 22 may use client 20 to register to participate in trading system 10. Upon registration, trader 22 may submit to trading platform 30 biographical data, employer data, and/or account information. In particular, trader 22 may use client 20 to submit contact data 86 for one or more clients 20 associated with trader 22. Contact data 86 for client 20 may comprise a network address, an email address, a phone number, a port identifier, an IP address, and/or any other suitable information for contacting client 20. Upon registration of trader 22, trading platform 30 may generate and store in memory 80 a particular trader profile 84 for trader 22. Trading platform 30 may store in trader profile 84 contact data 86 and other information submitted by trader 22. After registering with trading platform 30, trader 22 may subsequently access and update contact data 86 and other information stored in trader profile 84. It should be understood that memory 80 in trading platform 30 may store trader profiles 84 for any number and combination of traders 22.

After registering to participate in trading system 10, a particular trader 22 may use client 20 to submit trading orders 12 to trading platform 30. In some embodiments, upon receiving trading order 12 associated with trader 22, processor 90 may record trading order 12 in the appropriate order stack 94 in memory 80. In other embodiments, processor 90 may route trading order 12 to one or more market centers 40 for execution. Processor 90 may record in order log 88 in trader profile 84 associated with the particular trader 22 the size, price, and time of trading order 12. Processor 90 may record, as status data 92, the current status of trading order 12 in order log 88. For example, when trading order 12 is received from client 20, processor 90 may record in order log 88 "pending" as status data 92 of trading order 12. Processor 90 may subsequently monitor trading order 12 to determine whether trading order 12 is executed, canceled, modified, or otherwise processed. In some embodiments, processor 90 may detect a change in status of trading order 12 based at least in part on activity in order stack 94 and/or based at least in part on market data 72 from market centers 40. Upon detecting a change in status of trading order 12, processor 90 may update status data 92 in order log 88. For example, if processor 90 receives an execution message from market center 40 regarding trading order 12, processor 90 may update status data 92 in order log 88 to indicate that trading order 12 has been executed.

Once client 20 has established a network connection with trading platform 30, sensor 62 in client interface 60 may monitor the network connection between client 20 and trading platform 30. In some embodiments, sensor 62 may periodically send test signals 66 to client 20. Test signal 66 may represent any message, command, request, signal, or data packet configured to invoke a response from client 20. For example, test signal 66 may comprise a "status" function, a "get variable value" command, or any number and combination of suitable signals. The process of transmitting test signals 66 to client 20 may be referred to as "pinging" client 20. According to certain embodiments, if client 20 does not respond to one or more test signals 66 transmitted from sensor 62, then sensor 62 may determine that client 20 and/or network 50 has experienced a failure. The failure may be an error or malfunction of client 20, a network disconnection, an error associated with network 50, and/or any error that disrupts communication between trading platform 30 and client 20. Upon detecting the failure, sensor 62 may generate and transmit alert 64 to processor 90. In some embodiments, alert 64 comprises data identifying the particular client(s) 20 and/or the particular trader(s) 22 associated with or affected by the detected failure.

In certain embodiments, sensor 62 may, without pinging client 20, determine that client 20 and/or network 50 has experienced a failure. In some embodiments, client 20 may be configured to send to sensor 62 a particular alert 64 upon experiencing an error, malfunction, network disconnection, and/or disruption. In other embodiments, sensor 62 may receive notification of a failure from any suitable hardware and/or software component(s) associated with trader 22, client 20, and/or network 50.

As explained above, sensor 62 may transmit alert 64 to processor 90. Based at least in part on alert 64, processor 90 may identify the particular trader(s) 22 associated with and/or affected by the detected failure. For each identified trader 22, processor 90 may identify a respective trader profile 84. For a particular trader 22, processor 90 may identify in order log 88 in trader profile 84 the current status data 92 of trading orders 12 submitted by the particular trader 22. Processor 90 may then generate status message 14 reporting the current status data 92 of trading orders 12 in order log 88. In some embodiments, processor 90 may further determine whether and by how much the market position of trader 22 has changed since alert 64. If the market position of trader 22 has changed, processor 90 may configure status message 14 to indicate the net change(s) in market position of trader 22 since alert 64.

After receiving alert 64 associated with a particular client 20 of trader 22, processor 90 may identify in trader profile 84 contact data 86 for another client 20 associated with trader 22. Using the identified contact data 86, processor 90 may transmit status message 14 to the other client 20 associated with trader 22. Thus, even when a particular client 20 associated with trader 22 experiences a failure, trading system 10 is operable to maintain the flow of trading information to trader 22.

It should be understood that status data 92 in order log 88 and/or status message 14 may comprise any suitable information regarding the current status of trading order 12. For example, status data 92 may indicate whether trading order 12 is pending, cancelled, partially executed, or fully executed. As another example, status data 92 may indicate the position of trading order 12 in order stack 94. Thus, status data 92 may comprise any suitable information regarding the status of trading order 12.

In some embodiments, processor 90 may configure status message 14 to indicate current status data 92 for trading orders 12 that were pending at the time of alert 64. In other embodiments, processor 90 may configure status message 14 to indicate current status data 92 for all trading orders 12 in order log 88 in trader profile 84. In yet other embodiments, processor 90 may configure status message 14 to comprise status data 92 that was updated in order log 88 after the time of alert 64 or within a configurable period of time of alert 64. Thus, it should be understood that processor 90 may configure status message 14 to comprise status data 92 for any number and combination of trading orders 12 in order log 88.

As explained above, sensor 62 may be configured to periodically transmit one or more test signals 66 to clients 20. Test signal 66 may represent any message, command, request, signal, or data packet configured to invoke a response from client 20. It should be understood that sensor 62 may be configured to transmit one or more test signals 66 to a particular client 20 according to any suitable interval. In some embodiments, the time interval for pinging a particular client 20 associated with a particular trader 22 may be based at least in part on trader preferences 96 associated 20 with the particular trader 22.

Trader preferences 96 may comprise conditions, criteria, and/or strategies that trader 22 may deem relevant to a trading decision. Trader 22 may use client 20 to submit trader preferences 96 to trading platform 30. Trading platform 30 may store trader preferences 96 from a particular trader 22 in trader profile 84 associated with the particular trader 22. In some embodiments, trader preference 96 may specify one or more conditions for generating status message 14. For example, trader preference 96 may comprise an instruction to generate status message 14 if client 20 has been disconnected for more than a configurable period of time. As another example, trader preference 96 may comprise an instruction for processor 90 to generate status message 14 upon receiving a particular type of alert 64 (e.g., virus detection, network disconnection, network speed below a configurable threshold, and/or any other suitable type of alert 64). As yet another example, trader preference 96 may direct processor 90 to generate and transmit status message 14 if, after alert 64, the market position of trader 22 changes by more or less than a configurable threshold. In some embodiments, trader 22 may submit trader preferences 96 to trading platform 30 before, during, or after registration. It should be understood that trader preferences 96 may comprise ratios, price ranges, quantity ranges, thresholds, yield spreads, limits, conditions, and/or any other suitable criteria that trader 22 may deem relevant to his or her participation in trading system 10.

In some embodiments, status message 14 may comprise information regarding the net change in the market position of trader 22 over a configurable period of time. The market position of trader 22 may refer to the amount of a particular trading product owned (long position) or owed (short position) by trader 22. During the course of trading, the market position of trader 22 may change as trading orders 12 or price feeds associated with trader 22 are aggressed by counterorders from other traders 22. If a trader 22 is temporarily disconnected from trading platform 30, trader 22 may, upon reconnecting to trading platform 30, want to know the net change in his or her market position since being disconnected from trading platform 30. Based at least in part on order log 88 associated with trader 22, processor 90 is operable to determine the net change in market position of trader 22. Processor 90 may configure status message 14 to report the net change in market position of trader 22. Processor 90 may calculate the net change since any configurable point in time such as, for example, since the beginning of the trading day, since the time when the disconnection occurred, or any other suitable time.

In some embodiments, a particular client 20 may log into a network portal associated with trading platform 30 to initiate a trading session. Trading platform 30 may provide a logout procedure by which a particular client 20 may terminate a trading session with trading platform 30. In some embodiments, sensor 62 may begin to periodically ping client 20 with test signals 66 once client 20 has logged into trading platform 30. Once client 20 logs out of a trading session with trading platform 30, sensor 62 may be configured to stop pinging client 20 with test signals 66. In some embodiments, if client 20 stops responding to test signals 66 prior to logging out of the trading session with trading platform 30, sensor 62 may be configured to generate alert 64.

FIG. 2 illustrates an example trader profile 84, according to certain embodiments. As explained above, memory 80 may store at least one trader profile 84 for each trader 22 in trading system 10. In some embodiments, when trader 22 registers to participate in trading system 10, trading platform 30 may request trader 22 to submit account data, identity information, employer data, trader preferences 96, contact data 86, and/or any suitable information. Upon receiving the requested information from trader 22, trading platform 30 may generate trader profile 84 associated with trader 22. Trading platform 30 may store in trader profile 84 the information received from trader 22.

The example trader profile 84 illustrated in FIG. 2 comprises contact data 86 for multiple clients 20 associated with trader 22. In particular, for Workstations A and B associated with trader 22, trader profile 84 comprises particular IP addresses—1.160.10.240 and 2.234.20.120, respectively. For a PDA and a mobile phone associated with trader 22, trader profile 84 comprises particular phone numbers—571.242.1275 and 571.823.8573, respectively. Trader profile 84 further comprises two email addresses associated with trader 22—john@trader.net and ben@money.net. Thus, trader profile 84 associated with trader 22 comprises contact data 86 for multiple clients 20 associated with trader 22.

Contact data 86 in the example trader profile 84 further indicates a particular client classification for each client 20. In some embodiments, a client classification indicates whether a particular client 20 is a primary client 20, a secondary client 20, and so forth. In some embodiments, trading platform 30 may be configured to first send status messages 14 to primary client(s) 20 if a network connection is established with primary client(s) 20. If no network connection is established with primary client(s) 20, trading platform 30 may be configured to send status messages 14 to secondary client(s) 20, tertiary client(s) 20, and/or any suitable class of clients 20. In some embodiments, trader 22 may use client 20 to designate which clients 20 are primary clients 20, secondary clients 20, and so forth.

In the foregoing example, contact data 86 comprises source IP addresses, phone numbers, and email addresses. It should be understood, however, that contact data 86 may comprise one or more network addresses, port identifiers, email addresses, phone numbers, and/or any suitable data for communicating with clients 20 associated with trader 22.

The example trader profile 84 comprises trader preferences 96. The first trader preference 96 in the example trader profile 84 directs trading platform 30 to generate and transmit status message 14 if client 20 associated with trader 22 is disconnected from trading platform 30 for more than five minutes. The second trader preference 96 in the example trader profile 84 directs trading platform 30 to generate and transmit status message 14 if the transmission speed of the network connection between client 20 and trading platform 30 is less than 46 kbps.

Although trader preferences 96 in the example trader profile 84 are based on disconnection time and network speed, respectively, it should be understood that trader preferences 96 may be based on any suitable criteria such as, for example, trading volume, size of pending trading orders 12, market prices, and/or any number and combination of suitable criteria. It should be further understood that trader profile 84 associated with trader 22 may comprise any number and combination of trader preferences 96. In some embodiments, if trader 22 does not submit trader preferences 96 to trading platform 30, trading platform 30 is operable to store default trader preferences 96 in trader profile 84. The default trader preferences 96 may comprise default thresholds for connection speed, for disconnection time, for market price, and/or for any number and combination of suitable criteria for triggering the transmission of status message 14.

The example trader profile 84 further comprises order log 88. Order log 88 in the example trader profile 84 comprises data regarding the size, price, and trading product associated with trading orders 12 submitted by trader 22. Order log 88 further comprises status data 92 associated with trading order 12, the time at which trading platform 30 received trading order 12, the particular client 20 that transmitted trading order 12, and the time at which status data 92 of trading order 12 was last updated. For example, order log 88 indicates that, on Jun. 7, 2006, Bid A for 1,000,000 units of Trading Product X was received from Workstation A at 15:45:32 and was executed at 15:46:05. In a similar fashion, order log 88 indicates the size, price, and status data 92 of Offers B and C and Bids D and E. In this example, order log 88 indicates that Offer B was canceled at 15:48:10 and that Offer C and Bid D were executed at 15:48:30 and 15:49:05, respectively. Bid E, which was received at 15:48:06, is still pending.

In the present example, sensor 62 is configured to ping client 20 every two seconds with test signal 66. Accordingly, at 15:48:08—two seconds after receiving Bid E from Workstation A associated with trader 22—sensor 62 transmits test signal 66 to Workstation A. In the present example, however, Workstation A has experienced a failure that has caused Workstation A to be disconnected from network 50. Accordingly, Workstation A fails to receive and respond to test signal 66 from sensor 62. Upon detecting the failure of Workstation A to respond to test signal 66, sensor 62 generates alert 64 and transmits alert 64 to processor 90. Upon receiving alert 64, processor 90 identifies in trader profile 84 at least one trader preference 96 regarding the transmission of status messages 14. In the present example, processor 90 identifies a particular trader preference 96 to generate and transmit status message 14 if client 20 is disconnected for more than five minutes. In the present example, trading platform 30 does not receive any responses from Workstation A during the five minutes following alert 94. Accordingly, based at least in part on the first trader preference 96 in trader profile 84, Workstation A generates status message 14 at 15:53:08.

In the present example, processor 90 generates status message 14 for the particular trading orders 12 that were pending at the time of the network disconnection. In particular, processor 90 determines that Offers B and C and Bids D and E were pending at the time of the network disconnection. Accordingly, processor 90 configures status message 14 to include information regarding Offers B and C and Bid D and E. In this example, because order log 88 indicates that Bid A was executed prior to the network disconnection, trading platform 30 does not include information regarding Bid A in status message 14.

After identifying in trader profile 84 the particular trading orders 12 that were pending at the time of the network disconnection, processor 90 determines the current status data 92 of the identified trading orders 12 in trader profile 84. In this example, processor 90 determines that Offer B was canceled at 15:48:10, that Offer C was executed at 15:48:30, that Bid D was executed at 15:49:05, and that Bid E is still pending. Processor 90 then generates status message 14 indicating the current status data 92 associated with Offers B and C and Bids D and E.

In conjunction with generating status message 14, trading platform 30 identifies in trader profile 84 contact data 86 for one or more clients 20. In the present example, trading platform 30 is configured to transmit status message 14 to secondary clients 20 upon detecting a network disconnection of the primary client 20. Accordingly, trading platform 30 identifies in contact data 86 that Workstation B (IP address 2.234.20.120) and E-mail Account A (john@trader.net) are secondary clients. Accordingly, trading platform 30 addresses status message 14 according to contact data 86 associated with Workstation B and E-mail Account A. Trading platform 30 then transmits status message 14 to Workstation B and E-mail Account A via network 50.

FIG. 3 illustrates an example status message 14, according to certain embodiments. In particular, status message 14 indicates that the time of alert 64 is 15:48:08 and that the time of status message 14 is 15:53:08. Status message 14 further indicates the quantity, price, status data 92, and trading product associated with the particular trading orders 12 that were pending when trading platform 30 detected the network disconnection. For example, status message 14 indicates that Offer B for 5,000,000 units of trading product Y was received from Workstation A at 20 15:47:14 and was executed at 15:48:10—two seconds after trading platform 30 detected the network disconnection. In a similar fashion, status message 14 indicates the characteristics and current status data 92 of Offer C and Bids D and E.

In some embodiments, in conjunction with determining the current status data 92 of trading orders 12, trading platform 30 is operable to calculate the net change in market position of trader 22. The market position of trader 22 may refer to the amount of a particular trading product owned (long position) or owed (short position) by trader 22. Trading platform 30 may be configured to determine the net change in market position of trader 22 during the past hour, since the time of alert 64, since the beginning of the trading day, or according to any suitable time period. In the present example, trading platform 30 is configured to determine the net change in market position of trader 22 since the time of alert 64. In this example, trading platform 30 determines that market position of trader 22 with respect to trading product Y is unchanged because Offer B for Trading Product Y was canceled. Trading platform 30 further determines that, since the time of alert 64, Offer C for 3,000,000 units of Trading Product Z and Bid D for 10,000,000 units of Trading Product Z were executed. Accordingly, trading platform 30 indicates in status message 14 that, since the time of alert 64, trader 22 is long by 7,000,000 units of Trading Product Z. Because Bid E for Trading Product X is still pending, trading platform 30 determines that the market position of trader 22 with respect to trading product X is unchanged since the time of alert 64.

In the foregoing example, trading platform 30 is configured to calculate the net change in market position of trader 22 since the time of alert 64. It should be understood that trading platform 30 may be configured to calculate the change in market position of trader 22 since the beginning of the week, since the beginning of the trading day, or according to any suitable time period. It should be further understood that trading platform 30 may be configured to calculate and indicate in status message 14 any suitable metric such as, for example, changes in market prices since the time of alert 64, trading volumes since the time of alert 64, or any number and combination of suitable metrics.

In the foregoing example, a particular trader preference 96 directs trading platform 30 to generate and transmit status message 14 if client 20 is disconnected from trading platform 30 for more than five minutes. It should be understood that trader preference 96 may direct trading platform 30 to generate and transmit status message 14 if client 20 is disconnected from trading platform 30 for more than ten seconds, for more than one minute, or for more than any suitable period of time. It should be further understood that trader preference 96 may direct trading platform 30 to generate and transmit status message 14 immediately upon detecting that client 20 is disconnected from trading platform 30.

Although the foregoing example illustrates trader preference 96 for transmitting status message 14 based on time of network disconnection, it should be understood that trader preference 96 may be based on any number and combination of suitable criteria.

In the foregoing examples, sensor 62 generated alert 64 upon determining that client 20 had experienced a failure such as a network disconnection. It should be understood, however, that sensor 62 may be configured to generate alert 64 upon detecting any type and/or combination of events. In particular, sensor 62 may be configured to generate alert 64 upon detecting a data packet, sent from client 20, that represents a network intrusion attempt or comprises potentially harmful code such as, for example, a virus, spyware, a trojan horse, a worm, or any other harmful communication. In response to receiving such alert 64 associated with a particular client 20, client interface 60 may be configured to terminate the network connection between trading platform 30 and the particular client 20. In conjunction with the network disconnection of the particular client 20, processor 90 may determine current status data 92 for trading orders 12 from trader 22 associated with the particular client 20. Processor 90 may then generate status message 14 comprising the determined status data 92. Processor 90 may identify in trader profile 84 contact data 86 for another client 20 of trader 22. Processor 90 may then transmit status message 14 to the other client 20 of trader 22.

It should be understood that trading system 10 provides various technical advantages, according to certain embodiments. In some embodiments, trading system 10 is operable to detect when a first client 20 associated with trader 22 experiences a failure or network disconnection. In conjunction with detecting a failure or network disconnection, trading system 10 may determine the status of trading orders 12 associated with trader 22. In some embodiments, trading system 10 is further operable to calculate metrics such as, for example, the net change in market position of trader 22 since the time of alert 64. Trading system 10 may then generate and transmit status message 14 to a second client 20 associated with trader 22. Thus, trading system 10 may maintain real-time flow of status information to trader 22 even when a particular client 20 associated with trader 22 experiences a failure or network disconnection. By maintaining real-time flow of status information to trader 22, trading system 10 may promote confidence of trader 22 in the reliability of trading system 10. Because traders 22 with confidence in trading system 10 are more likely to submit more and/or larger trading orders 12, trading system 10 may increase liquidity in the market.

FIG. 4 illustrates a flow chart for generating status message 14, according to certain embodiments. The method begins at step 402 by storing in memory 80 a plurality of trader profiles 84. A particular trader profile 84 may be associated with a particular trader 22 and may comprise first contact data 86 associated with a first client 20 and second contact data 86 associated with a second client 20. The method continues at step 404 by storing in memory 80 at least one trading order 12 that is pending execution and that was received from the first client 20 associated with the particular trader 22. In some embodiments, in conjunction with storing the at least one trading order 12, trading platform 30 may store in memory 80 current status data 92 of the at least one trading order 12. According to certain embodiments, status data 92 of trading order 12 may be expressed as pending, executed, or cancelled. In other embodiments, status data 92 of trading order 12 may be expressed as a position in order stack 94. In some embodiments, trading platform 30 may process the at least one trading order 12 by matching the at least one trading order 12 with at least a portion of a counterorder. In other embodiments, trading platform 30 may process the at least one trading order 12 by routing the at least one trading order 12 to one or more market centers 40 for execution. Upon detecting execution, cancellation, or other modification of the at least one trading order 12, trading platform 30 may update status data 92 of trading order 12 in memory 80.

At step 406, sensor 62 monitors a network connection between the first client 20 and trading platform 30. According to certain embodiments, sensor 62 is operable to monitor the network connection by periodically transmitting test signals 66 to the first client 20. Test signal 66 may be a "status" function, a "get variable value" command, or any number and combination of suitable messages, commands, requests, signals, or data packets configured to invoke a response from the first client 20. At step 408, sensor 62 detects an alert 64 associated with the first client 20. In some embodiments, detecting an alert 64 associated with the first client 20 comprises determining that a network connection between the first client 20 and trading platform has be terminated. The determination that the network connection has been terminated may be based at least in part on a failure of the first client 20 to respond to one or more test signals 66.

In conjunction with detecting the alert 64, trading platform 30 determines, at step 410, current status data 92 associated with the at least one trading order 12 in memory 80. In some embodiments, determining the current status data 92 of the at least one trading order 12 comprises determining a position of the at least one trading order 12 in the market. At step 412, trading platform 30 determines a net change in market position of the particular trader 22 during a configurable period of time. Trading platform 30 generates, at step 414, status message 14 indicating the determined current status of the at least one trading order 12 and the determined change in market position of trader 22. At step 416, trading platform 30 identifies in trader profile 84 contact data 86 associated with a second client 20 associated with trader 22. At step 418, trading platform 30 transmits status message 14 to the second client 20 based at least in part on the identified contact data 86. The method then 10 ends.

Although the present invention has been described in several embodiments, a myriad of changes and modifications may be suggested to one skilled in the art, and it is intended that the present invention encompass such changes and modifications as fall within the scope of the present appended claims.

What is claimed is:

1. An apparatus comprising
a memory;
at least one processor to:
store in the memory a plurality of profile information describing trader users and devices used by the traders, the profile information for a trader designating two device addresses for communicating with the trader, a first address being utilized for communication of trading commands and a second address being utilized for communication of alerts relating to communications failures to the trading command address;
maintain in the memory an order log that records a trading status of orders of respective traders received from the traders at their respective trading command addresses, and to monitor at a network sensor for network communication between network interfaces of the network sensor and network interfaces of the devices used by the traders at respective trading command addresses for communication failures;
in response to a network sensor detection of a communication failure at a trading command address, maintain communication with a failed trader device, after the communication failure over the trading command address; and
transmit an alert message to the second address of the failed trader device, the alert message comprising a trading status of orders of the failed trader device at a time when the communication failure occurred and/or reflecting trading of orders of the failed trader device after the communication failure.

2. The apparatus of claim 1, wherein the at least one processor is further configured to:
periodically transmit one or more test signals to a given trader device; and
detect a speed of transmission of at least one of the one or more test signals between the processor and the given trader device.

3. The apparatus of claim 1, wherein the at least one processor is further configured to detect that a network connection between at least one trader device and the processor has been terminated.

4. The apparatus of claim 1, wherein the memory is further operable to store plurality of profiles, each of the plurality of profiles comprising at least one market data metric, the at least one market data metric comprising information about at least one market condition in a trading platform.

5. The apparatus of claim 4, further comprising:
determine the at least one market condition in the trading platform;
generate at least one alert message defined within the at least one of the plurality of profiles if a determined market condition deviates from the at least one metric defined within the at least one of profiles; and
transmit the at least one generated alert message to at least trader device indicated within the at least one of the plurality of profiles.

6. The apparatus of claim 4, wherein the market condition at least in part comprises:
trading volumes, bid and offer prices, trends in prices, trends in trading volumes, time of entry of trading orders, a change in market position, number of outstanding trading orders, and number of active traders.

7. A method for an electronic trading system for communicating with interfaces of workstations over a communication network, the method comprising:
receiving, by at least one processor, profile information describing trader users of the system and devices used by the traders, the profile information for a trader designating two device addresses for communicating with the trader, a first address being used by the trading system as an address for communication of trading commands and a second address being used by the trading system as an address for communication of alerts relating to communications failures to the trading command address;
maintaining, by the at least one processor, an order log in a memory that records a trading status of orders of respective traders received from the traders at their respective trading command address;
monitoring, by the at least one processor, at a network sensor of the trading system for network communication between network interfaces of the network sensor and network interfaces of the workstations of the traders at the trading command addresses of the trader for communication failures;
detecting, by the at least one processor, a communication failure at a trading command address;
maintaining, by the at least one processor, communication with a failed trader device, after the communication failure over the trading command address; and
transmitting, by the at least one processor, an alert message to the alert address for the failed trader device, the alert message reporting trading status of orders of the failed trader device at a time when the communication failure occurred and/or reflecting trading of orders of the failed trader device after the communication failure.

8. The method of claim 7 further comprising:
periodically transmitting, by a processor of the electronic trading system, one or more test signals to a given trader device; and
detecting a below-threshold speed of transmission of at least one of the one or more test signals between the processor and the given trader device as a communication failure.

9. The method of claim 7 wherein detecting a communication failure further comprises detecting that a network connection between a trading command address of a given trading device and a trading platform has been terminated.

10. The method of claim 7, wherein criteria for determining a communications failure are user-configurable as part of a profile information.

11. The method of claim 10, further comprising monitoring for a communications failure further comprises monitoring for a market condition among market.

12. The method of claim 11, wherein the market condition at least in part comprises:
trading volumes, bid and offer prices, trends in prices, trends in trading volumes, time of entry of trading orders, a change in market position, number of outstanding trading orders, and number of active traders.

13. The method of claim 7, wherein the profile information further comprises an instruction directing the at least one processor to generate at least one alert message to be sent to at least one trader device when a virus infection is detected.

14. The method of claim 7, wherein:
the alert reports a change in market position since a communications failure occurred.

15. A method for an electronic trading system for communicating with interfaces of devices over a communication network, the method comprising:
storing in a memory profile information describing trader users and devices used by the traders, the profile information for a trader designating two device addresses for communicating with the trader, a first address being used by the trading system as an address for communication of trading commands and a second address being used by the trading system as an address for communication of alerts relating to communications failures to the trading command address, the profile information including trader-specified criteria for detecting an alert condition of respective devices, at least some of the trader-specified criteria specifying a threshold for network speed such that, if network speed falls below the threshold, devices communicating below the threshold are specified to be in an alert condition;
maintaining in the memory of the trading system an order log that records a trading status of orders of respective traders received from the traders at their respective trading command addresses, and monitoring at a network sensor of the trading system for network communication between network interfaces of the network sensor and network interfaces of workstations of the traders at respective trading command addresses for communication failures and for traders' specified alert conditions; and
on the network sensor detecting an alert condition or communication failure at a trading command address as specified in the profile information, to maintain communication with a failed trader device, after the communication failure from the trading command address, initiating communication between the failed trader device and the electronic trading system via the alert address that includes transmitting an alert message to the alert address for the failed trader device, the alert message reporting trading status of orders of the failed trader device at a time when the communication failure occurred and/or reflecting trading of orders of the failed trader device after the communication failure.

16. The method of claim 15, further comprising:
the trader profile information further including trader-specified criteria for detecting an alert condition of respective devices;
while processing orders in the electronic trading system, monitoring workstations of the traders at the respective trading command addresses that are specified in the alert conditions; and
on detecting an alert condition at a trading command address as specified in the profile information, transmitting an alert message to the alert address for the failed trader device, the alert reporting trading status of orders of the failed trader device at a time when the communication failure occurred and/or reflecting trading of orders of the failed trader device after the communication failure.

17. The method of claim 15, further comprising:
the trader profile information further including trader-specified criteria specifying a threshold for network speed such that if network speed falls below the threshold, devices communicating at below the threshold are specified to be in an alert condition;
while processing orders in the electronic trading system, monitoring network speeds against traders' specified thresholds; and
on detecting network speeds below the threshold specified for a trading command address as specified in the profile information, transmitting an alert message to the alert address for the trader, the alert reporting trading status of orders of the failed trader device at a time when then network speed was below the threshold and/or reports trading of orders of the failed trader device after the failed trader device fell below the threshold network speed.

* * * * *